Patented Apr. 19, 1932

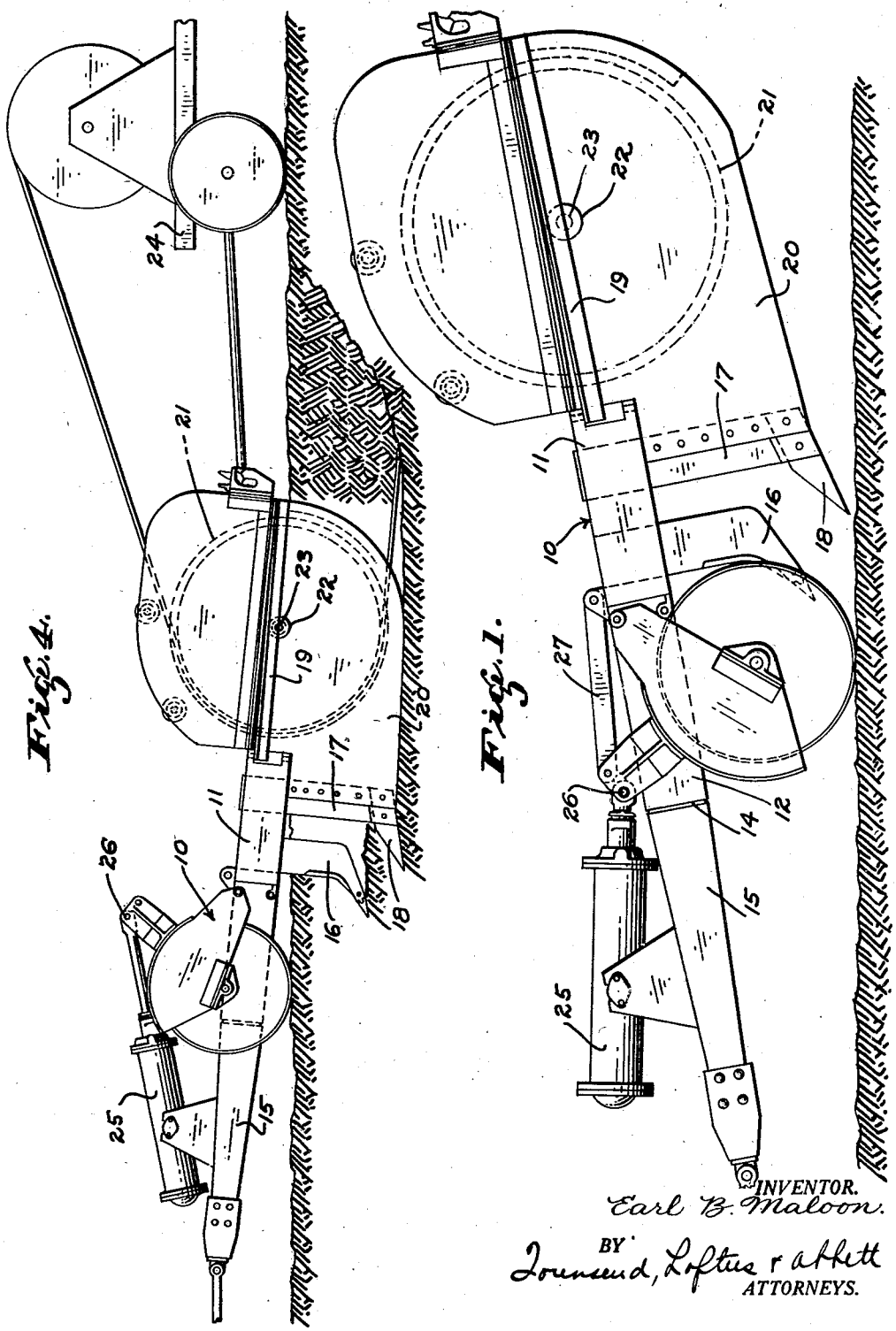

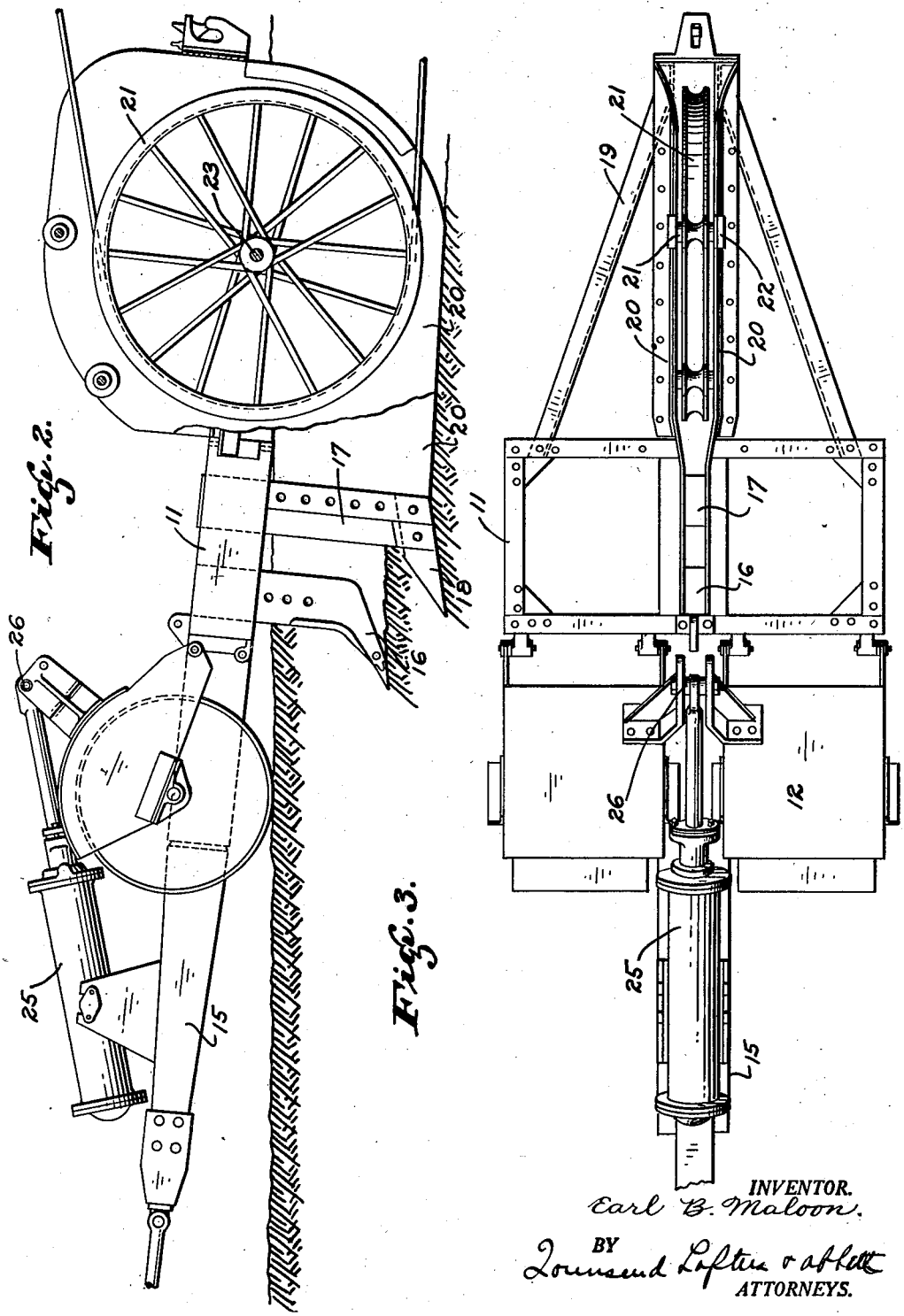

1,854,617

UNITED STATES PATENT OFFICE

EARL B. MALOON, OF OAKLAND, CALIFORNIA, ASSIGNOR TO AMERICAN TRACTOR EQUIPMENT COMPANY, OF OAKLAND, CALIFORNIA, A CORPORATION OF NEVADA

CABLE LAYING MACHINE

Application filed August 27, 1930. Serial No. 478,094.

This invention relates to machines for laying cable beneath the surface of the ground.

It is the principal object of the present invention to provide a generally improved machine capable of rapidly laying cable under the ground by forming a cut in the ground and laying a cable therein as a machine advances.

In carrying this invention into practice, I provide a tractor drawn implement fitted with an arm and a blade for forming a narrow cut in the ground of a desired depth when the implement is propelled forwardly. The implement is fitted with cable laying mechanism just behind the arm and blade which is adapted to lay a cable in the cut at the same rate of speed as the advance of the implement. As the implement advances, the cut fills in behind it burying the cable.

One form which the invention may assume is exemplified in the following description and illustrated by way of example in the accompanying drawings, in which:

Fig. 1 is a side elevation of the apparatus embodying the preferred form of my invention, showing the mechanism in inoperative position.

Fig. 2 is a side elevation of the apparatus, disclosing it in operative position and with parts in section to more fully disclose certain features of construction.

Fig. 3 is a plan view of the apparatus.

Fig. 4 is a side elevation of the apparatus in operation showing it with a cable carrying trailer attached to its rear end.

Referring more particularly to the accompanying drawings, 10 generally indicates a machine adapted to be drawn by a tractor for the purpose of laying cable beneath the surface of the ground. This machine comprises a rectangular frame 11 which is formed with a forwardly projecting portion 12 which is centrally located. This forwardly projecting portion is formed with a square inwardly tapering socket 14 to receive the tapered end of a hollow tongue 15. This tongue 15 is connected to the frame 11 as illustrated.

At its forward extremity the tongue 15 is formed with a hitch connection having a complementary part on a tractor so that the tongue may be connected with the tractor and the latter used to draw the cable laying implement forwardly.

Secured to the frame 11 on the longitudinal centerline of the machine is a pair of plow arms 16 and 17. These arms depend downwardly, the forward arm 16 being somewhat shorter than the rear arm 17. At the lower end of each arm is a plow blade or shoe 18. The forward edge of each of the arms 17 are bevelled so as to reduce the resistance as they are drawn through the ground.

It will be noticed that the shoes 18 are so designed that when they are engaged with the ground and the implement is drawn forwardly, their peculiar construction or their "suck" will cause them to penetrate to the full extent permitted by the construction of the implement.

At the rear of the frame 11, I provide a sub-frame 19 which includes a pair of spaced plates 20 which are firmly secured at their forward ends to the plow arm 17. The lower edges of the plates are disposed on the same plane as the lower end of the plow arm 17. The plates are equally spaced upon opposite sides of the longitudinal center line of the apparatus and extend rearwardly so as to form a housing for a sheave 21 arranged in longitudinal alignment with a plow arm 17. The plates 20 extend upwardly and rearwardly a distance sufficient to fully enclose the sheave 21.

The plates 20 are formed with aligned bearings 22 which receive an axle 23 about the axis of which the sheave 21 revolves. It will be noticed that the lower rear corners of the plates 20 are curved on a radius emanating from the center of the axle 23, but are cut on a radius slightly larger than the greatest radius of the sheave 21. The spacing of the plates is but slightly greater than the thickness of the plow arm 17 so that these plates together with the sheave may be drawn through the cut in the ground made by the plow arms 16 and 17. The purpose of this sheave is to lay a cable into the cut in the ground caused by the plow arm 17 and the plow shoe 18.

It will be noticed that the rim of the sheave 21 is formed with a groove which is semi-circular in cross section. A cable is led from a rear trailer 24 carrying a reel of cable over the sheave around the forward portion thereof and then around beneath the sheave. In laying the cable the end thereof after being led around the sheave is anchored so that as the implement advances, the cable will be laid in the cut formed by the plow arms 16 and 17.

It will be noticed that the plate and sheave will be moved forwardly in the cut formed by the plow arms 16 and 17. This cut, however, fills in immediately behind the sub-frame composed of the plates 20. Thus, as the implement is drawn forwardly and a cut is made in the ground, the cable is laid therein and thereafter the cut fills up concealing the cable.

In order to raise the frame 11 to an inoperative position and to permit the same to lower to operating position, it is provided with a wheeled truck arranged just forwardly of the body portion of the frame 11 as illustrated in the drawings. The frame of the truck carries two wheels which are disposed at equal distances upon opposite sides of the longitudinal center of the implement. The frame of the truck is pivotally connected at its rearward end to the frame 11 at opposite sides thereof as illustrated most clearly in Fig. 2.

Pivotally mounted on the tongue 15 is a longitudinally disposed hydraulic cylinder 25 having closed ends. A piston is, of course, reciprocably mounted in this cylinder and its piston rod is pivotally connected to the truck frame as at 26. This connection is such that reciprocation of the piston rod will cause the truck frame to revolve about the axis of the wheels and thereby raise and lower the frame 11. The hydraulic cylinder is, of course, double-acting and when the piston is in its forwardmost position, the truck frame will be swung to such an extent that the plow shoes at the lower end of the plow arms 16 and 17 will be disposed above the surface of the ground so that the device may be transported from place to place. In such event the frame 11 and the truck frame are rigidly connected by a link 27 shown in Fig. 1 so that the plow shoes and the cable laying mechanism will remain elevated from the ground and enable the entire apparatus to be moved from place to place on the wheels.

The hydraulic cylinder 25 is operatively connected with a suitable pump which is mounted on the tractor and controlled by the operator of the tractor.

In operation of the apparatus, it is assembled substantially as illustrated in the drawings and the drawbar or tongue 15 is hinged to the tractor and at the same time fluid conducting connections are made between the pump and the tractor and the cylinder 25. The fluid flow to the cylinder 25 is, of course, controlled through the medium of a valve so that the operator of the tractor will have full control of the implement.

Assuming that the plow arms are in elevated position as shown in Fig. 1, if it is desired to place the apparatus in operation, the link 27 is removed and the fluid supply to the cylinder 25 so controlled that the frame 11 will lower due to the rearward swinging of the truck frame about the axis of the wheels. As the plow shoes 18 engage the ground the "suck" thereof caused by their peculiar formation and the forward motion of the apparatus will cause them to penetrate into the ground to the full depth permitted. As the plow shoes penetrate a cut will be formed into which the sub-frame carrying the cable laying sheave will lower. As the device advances, cable will be unreeled from the reel and laid into the cut. This cut will, of course, fill in immediately at the rear of the sub-frame and cover the cable.

From the foregoing it is obvious that I have provided an improved machine for rapidly laying cable beneath the ground which machine forms the cut in the ground and lays the cable therein at the same rate of speed as the advance of the implement.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. An implement of the character described comprising a frame having a drawbar whereby it may be connected with a tractor, a plow arm depending from the frame, a plow shoe at the lower end of the arm, a wheeled truck entirely supporting said frame and pivotally connected to the frame for vertical swinging movement relative thereto, means for swinging said truck about the axis of its wheels to raise and lower said frame, and means connected with said frame at the rear of the plow arm for laying a cable in a cut in the ground formed by said plow arm as the implement is advanced.

2. An implement of the character described comprising a frame, means depending from the frame adapted to engage the ground to form a cut therein, said frame having a drawbar whereby it may be connected with a tractor, a wheeled truck entirely supporting said frame and pivotally connected to said frame and capable of swinging movement about the axis of its wheels, a power unit operatively connected to said truck for swinging the same about said axis and relative to the frame to raise and lower the latter, a sub-frame connected with said frame at the rear of said cutting means and adapted to travel through the cut formed by said cutting means, said sub-frame carrying means for guiding and laying a cable in the cut formed by the cutting means at the same rate of speed as the advance of the implement.

3. An implement of the character described comprising a frame adapted to be connected with a tractor, a plow arm depending from the frame, a plow shoe at the lower end of the arm, said arm and shoe adapted to form a cut in the ground when engaged therewith, a wheeled truck pivotally connected at its rear end to said frame, reversible power means carried by said frame and connected with said truck for swinging the same about the axis of its wheels to raise and lower the frame, a sub-frame extending rearwardly from said plow arm in longitudinal alignment therewith, a sheave carried by the sub-frame and over which a cable may be led, said sheave being arranged in the plane of the longitudinal center of the implement and with its lower edge disposed at a point just above the level of the lower end of the plow arm whereby the sub-frame and sheave will pass through the cut formed by the plow arm, and a cable led over the sheave laid in said cut.

4. An implement of the character described comprising a frame adapted to be connected with a tractor, a plow arm depending from said frame and having a plow shoe at its lower end, said plow arm and shoe adapted to form a cut in the ground when engaged therewith, a wheeled truck pivotally connected at its rear end to said frame for vertical swinging movement in a vertical plane, a reversible hydraulic power unit carried by the frame and operatively connected to said truck for causing the truck to pivot about the axis of its wheels to raise and lower the frame, a sub-frame including a pair of plates arranged on opposite sides of the longitudinal center line of the implement and extending rearwardly from the plow arm in parallelism with the longitudinal center line of the implement, a sheave arranged on the longitudinal center of the implement intermediate the plates and journalled therein, the bottom of the plates being disposed on a level substantially the same as the lower end of the plow arm, the bottom edge of the sheave being disposed on a level a short distance above the bottom of the plates, a connection at the rear of the sub-frame, a reel trailer adapted to be connected with said sub-frame, and a cable led over the sheave whereby the sheave will cause the cable to be laid in the cut formed by the plow arm as the implement advances.

5. An implement of the character described comprising a vertically adjustable frame adapted to be drawn by a tractor, a plow arm depending from the frame to form a cut in the ground when engaged therewith, a sheave mounted at the rear of the plow arm in longitudinal alignment therewith with its bottom edge arranged on a level just above the bottom of the plow arm, a cable reel at the rear of the sheave whereby the cable on the reel may be led over the sheave and laid thereby into the cut caused by the plow arm as the implement is advanced.

6. An implement of the character described comprising a frame adapted to be drawn by a tractor, a plow carried thereby and adapted to form a cut in the ground, a sub-frame comprising a pair of plates extending rearwardly of said plow, a sheave journalled between said plates and positioned with its bottom edge a short distance above the bottom of the plates, whereby a cable laid over the sheave may be fed at a point between said plates into the cut formed by the plow.

EARL B. MALOON.